United States Patent Office 2,930,303
Patented Mar. 29, 1960

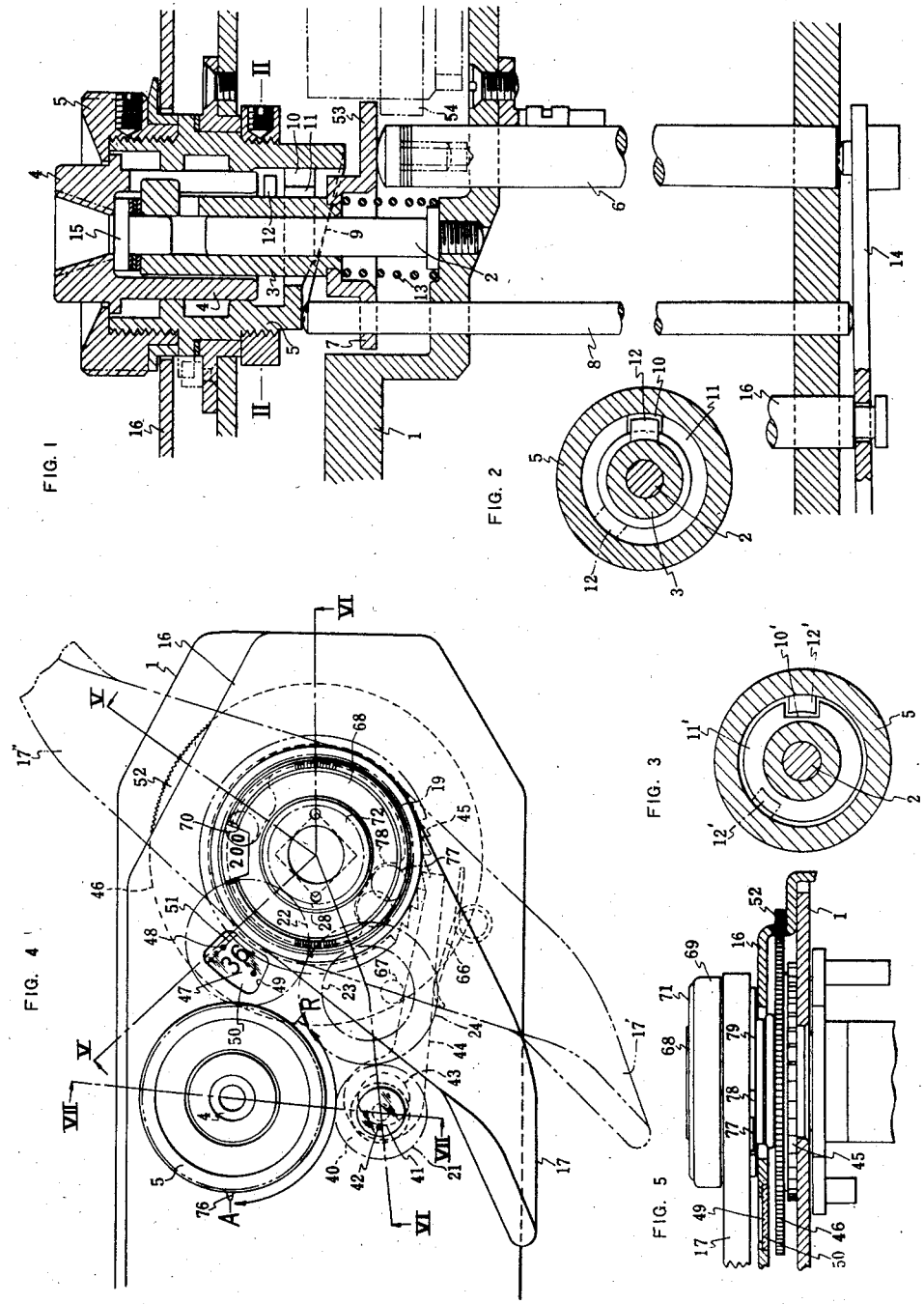

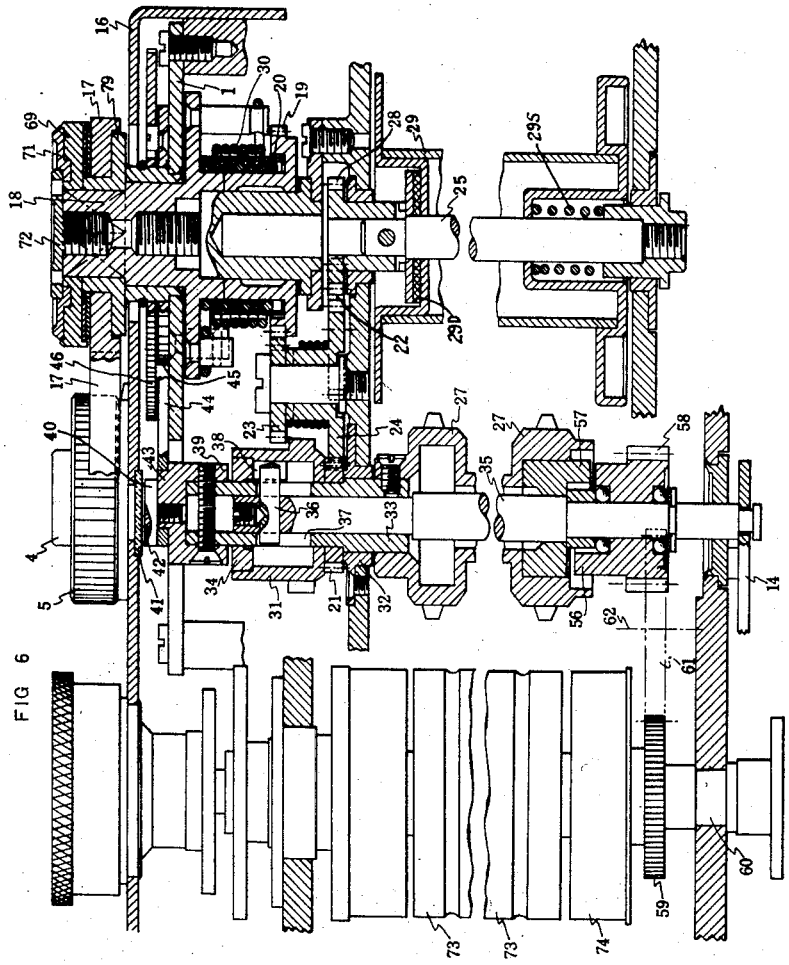

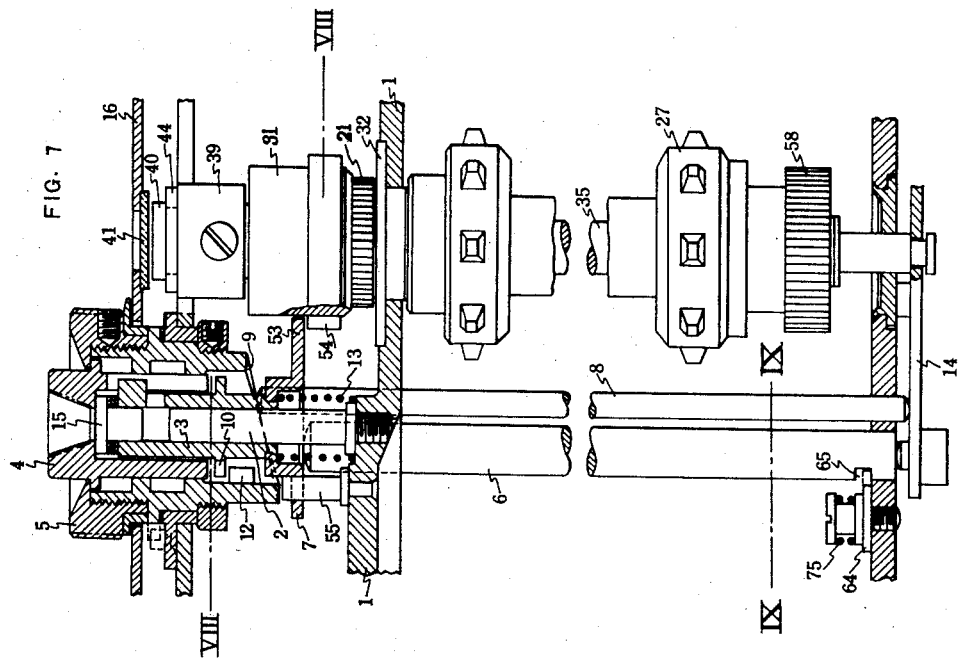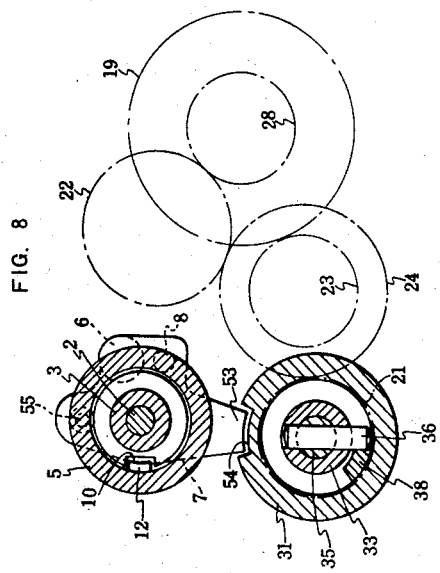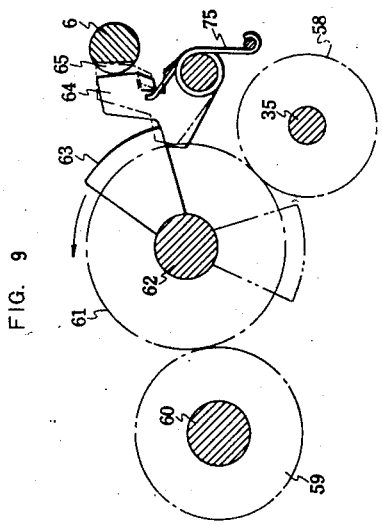

2,930,303

SAFETY DEVICE FOR SHUTTER RELEASE
IN CAMERA

Yoshiharu Sago, Meguroku, Tokyo, Satoru Nemoto, Nakanoku, Tokyo, and Masamichi Kakunodate, Setagayaku, Tokyo, Japan, assignors to Canon Camera Company, Inc., Otaku, Tokyo, Japan, a corporation of Japan Application November 16, 1955, Serial No. 547,216

Claims priority, application Japan December 16, 1954

7 Claims. (Cl. 95—31)

This invention relates to mechanisms for cameras to secure the desired and proper functioning thereof in respect of their film advancing mechanism, their film rewinding mechanism, their shutter release button, their exposure counting dial, etc.

An object of this invention is to provide a simple and accurate locking mechanism for the shutter release button and the film rewinding knob.

Another object of the invention is to provide a device which assures fool-proof operation of the shutter release button.

Still another object is to provide a locking means for the film winding mechanism and the shutter release button.

And still another object of the invention is to provide a camera in which the devices and mechanisms above mentioned are provided in novel relation and combination and in a compacted area.

A clear concept of the scope and purpose of this invention will be obtained from the following description of an illustrative embodiment thereof, taken in connection with the attached drawing, in which:

Fig. 1 shows an elevational section of the locking mechanism of the shutter release button and of the film reversing knob according to the instant invention;

Fig. 2 is a simplified cross-section thereof on line II—II of Fig. 1;

Fig. 3 is a cross-section, similar to that of Fig. 2, of a slightly modified construction;

Fig. 4 is a plan view of that portion of the camera provided with the various mechanisms initially above mentioned in accordance with the invention;

Fig. 5 is a longitudinal section along line V—V of Fig. 4;

Fig. 6 shows a longitudinal section along line VI—VI of Fig. 4;

Fig. 7 shows a longitudinal section along line VII—VII of Fig. 4;

Fig. 8 shows a transverse section along line VIII—VIII of Fig. 7 clearly showing the interrelation between the locking device of the film winding mechanism and the shutter release button; and Fig. 9 shows a transverse section along line IX—IX of Fig. 7 clearly showing the device to assure fool-proof operation of the shutter release button.

Referring to the drawing, the camera body 1 is provided, as best seen in Fig. 1, with an elongated shaft 2 about which a slidable sleeve 3, a release button 4 and a reversing cylindrical knob 5 are coaxially disposed. The lower end of slidable sleeve 3 has a washer 7 formed thereon, or attached thereto, to push down a rod 6. A cam 9 to operate a reversing rod 8 forms the bottom of reversing cylindrical knob 5. A locking mechanism consisting of radial projection 12 on elongated shaft 2 and a flange 11 having a groove 10 extending inwardly toward sleeve 3 from reversing knob 5. Alternatively the locking mechanism may be so construction as to provide projection 12′ extending inwardly from reversing knob 5 and affixing to slidable sleeve 3 a flange 11′ with a groove 10′ registerable and engageable with projection 12′, as shown in Fig. 3. Helical spring 13, supported on camera body 1, biases sleeve 3 upwardly on shaft 2, while plate spring 14 at its free end engages the lower ends of rods 6 and 8 to bias them upwardly.

In this locking device, when release button 4 is depressed, either directly by the finger of the camera user or by means of a cable release, slidable sleeve 3 is pushed downwardly by means of cross-member 15, supported atop sleeve 3, and thereupon rod 6 is pushed downwardly by washer 7. This depresses plate spring 14 carrying with it shaft 16 and thus disengages the clutch between the shaft of the shutter winding drum and the film feeding sprocket, as hereinafter described. This releases the shaft of the shutter winding drum so as to start the exposure movement of the shutter. And when reversing knob 5 is rotated to the exact reversed position, cam 9 pushes rod 8 downwardly and similarly plate spring 14 is moved to disengage the clutch between the sprocket and the shaft of the shutter winding drum to permit film rewinding. It follows that when reversing knob 5 is not exactly at the fully rotated position at which groove 10 coincides precisely with the projection 12 (12′), as shown in Figs. 2 and 3, each projection is in the downward path of shutter button 4 and prevents making an exposure.

Referring to Figs. 4 through 9, on top cover 16 of camera body 1 there is provided a winding lever 17 which winds film by turning it counterclockwise with the thumb of the right hand with the camera facing an object. Its shaft 18 is operatively connected with a gear 19 by means of a oneway clutch mechanism, for example, a coil spring 20 (Fig. 6). The rotation of gear 19 is transmitted to gears 21 and 22 through idler gears 23 and 24. Gear 22 meshes with gear 28 fixed on film winding shaft 23 which drives film spool 29 by friction coil spring 29S and friction disk 29D at its upper region. Gear 21 is integral with clutch element 31 operatively connected to sprocket 27, and gear 22 through gear 28 drives film winding shaft 25 carrying winding spool 29. When pressure on winding lever 17 is released, shaft 18 and the winding lever restore to normal position by the action of restoring spring 30.

As illustrated in Fig. 6, gear 21 and pot shaped clutch element 31 integral therewith, are arranged above and supported on bearing 32 affixed to the camera body. Sprocket 27 projects downward by a hollow shaft 33 from cover 34 of clutch 31, and shaft 35 within sprocket 27, capable of upward and downward movement, has its lower end supported on and in plate spring 14. Clutch pin 36 extends laterally from shaft 35 into clutch member 31 through axially elongated slot 37 in hollow shaft 33 of sprocket 27 so as to be engageable with clutch projection 38. A stub shaft 39 is affixed to the upper end region of hollow shaft 33 and a screw 40 at its top is arranged below camera cover 16 so as to constitute a film winding dial which can be seen and read through a transparent window 41 in camera cover 16, markings 42 being provided on the dial face of screw 40. An eccentric disk 43 integral with the upper end of stub shaft 39 is encircled by a feeding claw 44 for counting dial 46 to produce a feeding motion which acts on ratchet wheel 45 integral with counting dial 46. On the top face of counting dial 46 numerical markings 47 and dot-or-line markings 48 are interlacedly engraved at such position as readily to be seen through an arcuate elongated slot or reading window 49 provided with transparent glass 50. An indicating or reference line 51 of a different color from that of markings 47 and 48 is so positioned on glass 50 as to be registerable with and across markings 47 and 48. In order to enable setting the counting dial 46 initially to coincide with zero "0," a portion 52 of the counting dial is permitted to project beyond top cover 16 so that the dial may be rotated to read zero, or any desired scale amount, by a finger of the camera user.

As illustrated in Figs. 4, 7 and 8, shutter release button 4 is positioned adjacent to, but clear of, film winding dial 40 on slidable sleeve 3, as above described. Radial projection 53 on washer 7 and a groove 54 on clutch element 36 of sprocket 27 are positioned as to face each other, so that the shutter release button can be depressed only when sprocket 27 is at its normal rotated position with the film fully wound for exposure. Pin 55, fixed in camera body 1, presses through an aperture in washer 7, thereby preventing rotation of washer 7, radial projection 53, and slidable sleeve 3.

Clutch elements 56 and 57 are provided between gear 58, affixed to the lower portion of axially movable shaft 35 within sprocket 27, to allow free rotation, and the lower region of sprocket 27. Gear 58 is operatively connected, as shown in Fig. 9, with gear 59 on shutter winding drum shaft 60 through idler gear 61. On idler gear 61, or its shaft 62, a radial projection is so positioned as to engage a stop 64 which engages groove 65 of rod 6. As illustrated in Fig. 4, 66 is a push spring to engage the feeding pawl 44 with the ratchet wheel 45; 67 is a stop pin against which, after the feed pawl 44 releases from ratchet wheel 45, such pawl 44 returns; 68 is a film type indicator. As illustrated in Fig. 6, letters and numbers, representing the kind and the exposure index of film loaded into the camera, are marked in circular array on the top face of a disk 69 affixed atop shaft 18 in such manner as to be readable through an aperture 70 of a dial 71 attached to disk 69 by screw 72.

When winding lever 17 is positioned at 17' from its unoperated position, shown in solid lines in Fig. 4, and then rotated by the camera user's thumb to position 17", helical spring 20 is wound about shaft 18, thus transmitting motion to gear 19, to impart rotation through gears 23 and 24 to gear 21 operatively connected with sprocket 27, as also to gear 28 operatively connected with spool 29 through gear 22. Axially movable shaft 35 accordingly rotates through the clutch integral with gear 21, clutch projection 38 and clutch pin 36. Thus the film starts to move by means of sprocket 27 having hollow shaft 33 which constantly engages clutch pin 36 and elongated axial slot 37 with shaft 35, and is wound up on spool 29, when the shutter curtain is wound by motion transmitting gear 58 which engages sprocket 27 and the clutch elements 56 and 57, loosely set in the upwardly and downwardly movable shaft 35, to drums 73 and 74 through gears 61 and 59. On rotation of sprocket 27, stub shaft 39 at its top rotates simultaneously and indicates the film winding movement through film indicating dial 40 and its markings 42. At the same time, rotation of the eccentric disk 43 drives feeding pawl 44 to actuate ratchet gear 45 so as to advance the film indication on counting dial 46 by one step. By the rotation of sprocket 27, radial projection 63 on shaft 62 is brought to the solid line position of Fig. 9 to disengage stop 64 from groove 65 against the tension of spring 75 so that rod 6 may be depressed. When the sprocket remains stationary after advancing just one picture length of the film, projection 53 registers precisely with groove 54, as illustrated in Figs. 7 and 8, thereby enabling depression of shutter release button 4.

As shown in Fig. 7, by depressing shutter release button 4, or by depressing cross-member 15 by a cable release, slidable sleeve 3 moves downwardly along shaft 2 against the tension of spring 13, and thus washer 7 pushes rod 6 to lower plate spring 14, shaft 35 moves downwardly to release clutch elements 56 and 57 between gear 58 and sprocket 27. Gear 58 accordingly moves freely about shaft 35 to allow the shutter curtain to be wound up on the drum to the left (not shown in the drawing) for the exposure. As gear 59 rotates with drum shaft 60, radial projection 63 moves to the position shown in the double dotted chain line in Fig. 9. Stop 64 engages with groove 65 of elevatable rod 6 in that plate spring 14 is depressed on depressing shutter release button 4.

The instant structure thus makes it impossible to push the release button down if exposed film has not been wound, and thus gives notice that the film requires winding and at the same time acting as a safety mechanism for the flash synchronizing circuit which includes a switch operatively connected and coupled to the release button (which last feature is not shown in the drawing but is well known and customary).

In order to rewind film, indicator 76 (Fig. 4) on the rewinding knob 5, disposed about shutter release button 4, is turned from A to R as shown in Fig. 4, and cam 9 depresses reversing rod 8, as shown in Fig. 7, so that both clutches, 36 and 38, and 56 and 57 on shaft 35 are released, in that the plate spring 14 is depressed in similar manner as on depressing the shutter release button, as above described. In such film rewinding stage, it will be noted that only such members as sprocket 27, rewinding dial atop hollow shaft 33, and shaft 35 operatively connected by clutch pin 36 and elongated axial slot 37, rotate to rewind the film quite independently of all the structural elements connected above clutch element 31 or below clutch element 56. When film rewinding knob 5 is restored to its normal position A, if this be not accurately done, projection 12 does not register axially with groove 10 rendering it impossible to depress the shutter release button. Hence the mechanism just described serves to eliminate possible failure to make an exposure.

In order to set counting dial 46 at the 0 indication, the tiny portion 52 projecting beyond cover 16 is to be turned by a finger of the camera user. The dial is engraved, as has ben stated, alternately with numerals 47 and dots or lines 48. Reading of the numbers appearing in aperture 49 can quickly and easily be done in view of their relatively large size, noting here that this particular marking system is quite different from the conventional marking of the indicator. Pin 77 is affixed to winding lever 17 so as to engage groove 78 of a flat thin plate 79 integral with shaft 18.

To provide a winding lever on miniature cameras, the space within which the winding lever, the film winding dial, the shutter release button, the rewinding knob, an accessory bracket, etc., must be disposed is necessarily limited. To overcome this difficulty, the camera of our invention is so designed and constructed that the winding dial 40 is axially aligned with sprocket 27, shutter release button 4 is slightly spaced from, and out of the way of, the winding lever, and the rewinding knob 5 is positioned about, and thus encircling, the shutter release button. With such arrangement of the elements, the available space suffices adequately for the incorporation of the various necessary and convenient mechanisms into the camera of our invention, and permits of relatively simple construction and assembly thereof, and consequently ready, facile and simple adjustment of each individual mechanism. It will be further noted that the arrangement of the release button blocking mechanism 53, 54, permitting the shutter release button to be depressed only when exactly one exposure length of film has been wound, as well as engaging mechanism 12 and 10, permitting operation of the shutter release button only when the rewinding knob is in its normal position, are of simple yet unique construction by positioning those elements having vertical motion to one side of the shutter release button, between the rotating elements on the side of the sprocket and the rewinding knob. By arranging the axially movable shaft 35 coaxially with sprocket 27 and operatively connecting it with such sprocket by pin 36 and elongated slot 37, and at the same time interconnecting such shaft by pot-shaped clutch element 31 which, in turn, is operatively connected with the winding lever by gearing, the sprocket disengages from the winding mechanism by the upward axial movement of shaft 35. Similarly, the sprocket engages with, or disengages from, the drum by supporting gear 58 freely rotatable about the lower part of such shaft 35 and operatively connectable with the sprocket by clutch elements 56 and 57, and also operatively connecting thereto the shutter winding drum by way of gear 59 integral with drum shaft 60. Thus the above simple construction guarantees accurate operation, and interruption of operation, of the mechanism solely by the vertical movement of shaft 35. As has been stated, the film conveying indicator dial 40 is formed on stub shaft 39 affixed to the upper end region of hollow shaft 33 of sprocket 27. Thus the face of the film conveyance indicator is constantly positioned at a fixed height to permit of it being readily seen at all times with the same degree of ease. The counting dial 46 is also so constructed as to be advanced one marking by feeding pawl 44 by rotation of the eccentric disk 43 mounted atop stub shaft 39, thus providing very simple means to advance the markings on the counting dial.

What we claim is:

1. In a photographic camera having a casing, a shutter, a film transport, means for operating the film transport to advance and rewind the film, means for tensioning the shutter, and means coupling the shutter tensioning means and film transport operating means for simultaneous operation upon film advancement, the combination comprising a vertical shaft extending upwardly in the camera casing, a first cylindrical sleeve having a button at its upper end coaxial with the shaft, a second cylindrical sleeve having an annular extension at its lower end coaxial with and slidable on the shaft, a coil spring about the shaft biasing the sleeves upwardly so that the button extends through the top of the camera casing, a cylindrical guide sleeve rotatably supported in the camera body and of such form as to limit the upward movement of the first and second sleeves under the coil spring bias, a vertical rod axially movable, a plate spring having one end affixed to the camera casing and supporting the lower end of the vertical rod on its free end region so that the upper rod end is against the annular extension of the second sleeve, a film transport shaft, an inseverable connection between the free end region of the plate spring and the lower end of the film transport shaft, shutter tensioning means gearing, a clutch coupling the film transport shaft to the shutter tensioning means gearing, a first radial projection integral with one of the second sleeve and the guide sleeve, and a first recess adapted to receive the radial projection in the other of the second sleeve and the cylindrical guide sleeve, the radial projection and recess being so positioned on the second sleeve and the cylindrical guide as to permit pressing down the button of the first sleeve to disengage the clutch only when the film is fully advanced one complete exposure length and the shutter tensioning means is completely tensioned.

2. In a photographic camera the combination according to claim 1 in which the clutch coupling the film transport shaft to the shutter tensioning gearing has a cup-shaped member thereof integral with the end gear of the shutter tensioning gearing, the cup-shaped member and the end gear being freely rotatable on the film transport shaft when the clutch is disengaged and rotatable with such shaft when the clutch is engaged, a second axial recess at a predetermined region in the outer cylindrical surface region of the cup-shaped member, and an integral projection of the second sleeve registering with the second recess only on full advancement of one exposure length of the film and completed tensioning of the shutter tensioning means to permit pressing down the button of the first sleeve.

3. In a photographic camera the combination according to claim 1 in which a first gear is rotatably integral with the film transport shaft, an intermediate gear having an integral shaft is rotatably supported on the camera casing meshing with the first gear, a shutter drum shaft, a second gear integral with the shutter drum shaft and meshing with the intermediate gear, a radially extending projection from the rotatable shaft integral with the intermediate gear, a notch in the lower end region of the vertical rod, a spring pressed pawl pivotable on the camera body and normally engaging the notch to prevent movement of the vertical rod axially, and a shoulder on the pawl engageable by the radial projection of the rotatable shaft only when the film transport means have advanced the film completely a full exposure length thus to pivot the pawl against its spring tension out of the notch to permit pressing down the button of the first sleeve.

4. In a photographic camera the combination according to claim 1 in which the lower end face of the cylindrical guide sleeve rotatably mounted in the camera casing is in the form of a cylindrical cam, a second vertical rod is supported at its lower end on the free end of the plate spring, the intermediate region of the second rod passing through a first aperture in the camera body and a second aperture in the annular extension at the lower end of the second sleeve, and the upper end of the second rod rides on the cylindrical cam, and a film rewinding ring integral with the rotatable cylindrical guide and coaxial with the button atop the camera top so that on manual rotation of the rewinding ring through substantially 180° from its position during the transport of film in exposure direction the second rod is depressed in turn to depress the plate spring to disengage the clutch to permit exposed film to be rewound and to prevent the operation of the release button since the first radial projection is not aligned with the first recess.

5. In a camera having a shutter, a film transport, means for operating the film transport to advance and rewind the film, means for tensioning the shutter, and means coupling the shutter tensioning means and film transport operating means for simultaneous operation upon film advancement, the combination comprising a manually operable shutter release means including an axially movable shaft, a winding ring forming a part of the film transport operating means coaxially with and rotatable on the shutter release shaft, said winding ring being settable in two extreme positions to condition the transport operating means for advancing and rewinding the film; cooperating abutment members on said ring and shutter release shaft to prevent operation of the shutter release means when said winding ring is not in one of its extreme positions, and cooperating abutment elements for the film transport and said shutter release shaft to prevent operation of the shutter release means in the absence of the completion of the film transport operating means in the film advancing direction and of the shutter tensioning means.

6. In a camera, the combination according to claim 5 in which a clutch is provided in the film transport operating means, a spring plate movable upon axial movement of the shutter release shaft for uncoupling said clutch to permit the film transport to remain stationary while the shutter tensioning means moves the shutter in its exposure direction, and means cooperating with said winding ring and said spring plate to uncouple said clutch when the winding ring is in one of its extreme positions to permit rewinding of the film.

7. In a camera, the combination according to claim 5 in which the means coupling the shutter tensioning means and the film transport operating means includes a projection rotatable thereby, a pawl in the path of the rotatable projection, a member movable with said shutter release shaft and formed with a notch for engagement by said pawl to prevent axial movement of the shutter release shaft, operation of the film transport operating means to advance the film and tension the shutter tensioning means rotating said projection to move and hold said pawl out of said notch upon completion of the operation to permit axial movement of the shutter release shaft, release of the shutter tensioning means rotating said projection to release said pawl for engagement with said notch.

References Cited in the file of this patent

UNITED STATES PATENTS

| | | |
|---|---|---|
| 2,057,198 | Marcussen | Oct. 13, 1936 |
| 2,104,094 | Nerwin | Jan. 4, 1938 |
| 2,117,429 | Kuppenbender | May 17, 1938 |
| 2,173,991 | Albert | Sept. 26, 1939 |
| 2,227,240 | Becker et al. | Dec. 31, 1940 |
| 2,229,606 | Hineline | Jan. 21, 1941 |
| 2,364,466 | Nagel | Dec. 5, 1944 |

FOREIGN PATENTS

| | | |
|---|---|---|
| 641,181 | Germany | Jan. 22, 1937 |
| 644,420 | Germany | May 3, 1937 |
| 500,626 | Great Britain | Feb. 13, 1939 |
| 526,498 | Great Britain | Sept. 19, 1940 |
| 825,483 | Germany | July 8, 1948 |